(12) United States Patent
Veltchev et al.

(10) Patent No.: US 6,590,730 B2
(45) Date of Patent: Jul. 8, 2003

(54) SYSTEM FOR MANAGING POWER IN A PORTABLE MUSIC PLAYER

(75) Inventors: Andrei Veltchev, Santa Cruz, CA (US); Girault Jones, Boulder Creek, CA (US); Howard N. Egan, Capitola, CA (US); Daniel Freeman, Santa Cruz, CA (US)

(73) Assignee: Creative Technology Ltd., Singapore (SG)

( * ) Notice: Subject to any disclaimer, the term of this patent is extended or adjusted under 35 U.S.C. 154(b) by 0 days.

(21) Appl. No.: 09/755,367

(22) Filed: Jan. 5, 2001

(65) Prior Publication Data

US 2002/0089774 A1 Jul. 11, 2002

(51) Int. Cl.$^7$ .......................... G11B 15/18; G11B 15/46
(52) U.S. Cl. ....................... 360/69; 360/73.03
(58) Field of Search ................. 360/7, 31, 69, 360/73.01, 73.03, 74.1

(56) References Cited

U.S. PATENT DOCUMENTS

| | | | |
|---|---|---|---|
| 4,984,103 A | * | 1/1991 | Nigam ...................... 360/74.1 |
| 5,787,292 A | * | 7/1998 | Ottesen et al. ....... 360/73.03 X |
| 6,310,848 B1 | * | 10/2001 | Ueki ................... 369/47.33 X |
| 2001/0008471 A1 | * | 7/2001 | Naohara et al. .............. 360/15 |

OTHER PUBLICATIONS

*MHJ2181AT, MHK2120AT, MHK2090AT, MHK2060AT Disk Drives Product Manual,* (C–141–E088–02EN), pp. 5–9, 6–10, 6–11, Fujitsu Limited, 1999.

* cited by examiner

*Primary Examiner*—Andrew L. Sniezek
(74) *Attorney, Agent, or Firm*—Blakely, Sokoloff, Taylor & Zafman LLP

(57) ABSTRACT

A technique for managing the modes of the hard disk drive to extend battery life and reduce noise. The technique may be implemented by a processor in a portable digital music player that stores audio tracks on a hard disk drive, for example. This technique includes reading a block of audio data from the disk and storing the block in a buffer while the disk is spinning. Subsequent to reading the block, the disk is spun down to a power-saving mode, while the block is played from the buffer. While the block is being played from the buffer, the technique includes monitoring the amount of the block left to be played. When the amount the block left to be played drops below a low threshold level, the disk is transitioned from the power saving mode back to a spinning mode so that data can be read from the disk before the block is finished being played from the buffer. Further, the voltage level from the batteries may be monitored, and if the voltage level is below a selected level, the disk is kept in the spinning state subsequent to reading the song from the disk to avoid a large current drain required to spin the disk up from the power saving mode.

3 Claims, 2 Drawing Sheets

SYSTEM FOR MANAGING POWER IN A PORTABLE MUSIC PLAYER

CROSS-REFERENCES TO RELATED APPLICATIONS

This application is related to application Ser. No. 09/755,629, entitled "System for Selecting and Playing Songs in Playback Device with a Limited User Interface," (Atty. Docket No. 17002-020800) now abandoned; and application Ser. No. 09/755,723, entitled "Automatic Hierarchical Categorization of Music by Metadata," (Atty. Docket No. 17002-022500) pending, both filed Jan. 5, 2001, the disclosures of which are incorporated herein by reference.

BACKGROUND OF THE INVENTION

Today, portable consumer electronic devices are more powerful than ever. For example, small, portable music playback devices can store hundreds, even thousands, of compressed songs and can play back the songs at high quality. With the capacity for so many songs, a playback device can store many songs from different albums, artists, styles of music, etc.

As users desire to store more songs on the portable music player different storage media are being used. A hard disk drive (HDD) has many benefits in terms of capacity, access time, cost. However, HDDs consume power and quickly drain batteries used in a portable music player.

Accordingly, HDDs have power saving modes, such as the STANDBY mode and the SLEEP mode. In both the STANDBY and SLEEP modes the motor is turned off and the disk spins down. Additionally, in SLEEP mode most of the electronic subsystems of the HDD are powered down to save additional power. However, to recover from SLEEP mode the drive must be reset which adds additional time to the recover. Typical recovery times are several seconds to transition from a power-saving mode to an IDLE mode.

In the IDLE mode the HDD is ready to transfer data and the disk is spinning. During reading or writing the HDD is in the ACTIVE mode.

Some HDDs automatically transition to a power saving mode from the IDLE mode if no read or write requests are received during a set time interval, e.g., 30 seconds.

Additionally, jitter is a problem when reading data from an HDD in portable device because the device is subject to jarring or bumping which causes glitches. Further, when the disk is spinning, noise and vibration is present which may be noticeable to a listener.

Accordingly, techniques for extending battery life and reducing jitter and noise in portable music players are being actively developed.

SUMMARY OF THE INVENTION

According to one aspect of the present invention, battery life is extended in a portable music player using an HDD to store audio tracks by transitioning the HDD to a power-saving mode when the a track is stored in the play buffer.

According to another aspect of the invention, the HDD is transitioned out of the power-saving mode when the buffer reaches a low threshold level so that a next audio track can be read from the HDD to the buffer before the present track is through playing.

According to another aspect of the invention, the HDD is not transitioned to the power-saving mode if the battery voltage is below a critical level to avoid a large current drain on the batteries occurring when the HDD transitions from the power-saving mode.

Other features and advantages of the invention will be apparent in view of the following detailed description and appended drawings.

DETAILED DESCRIPTION OF THE PREFERRED EMBODIMENTS

An embodiment of the invention implemented in the Nomad® Jukebox portable music player will now be described by way of example, not limitation. The principles of the invention are broadly applicable to portable music players in general.

Figure 1:
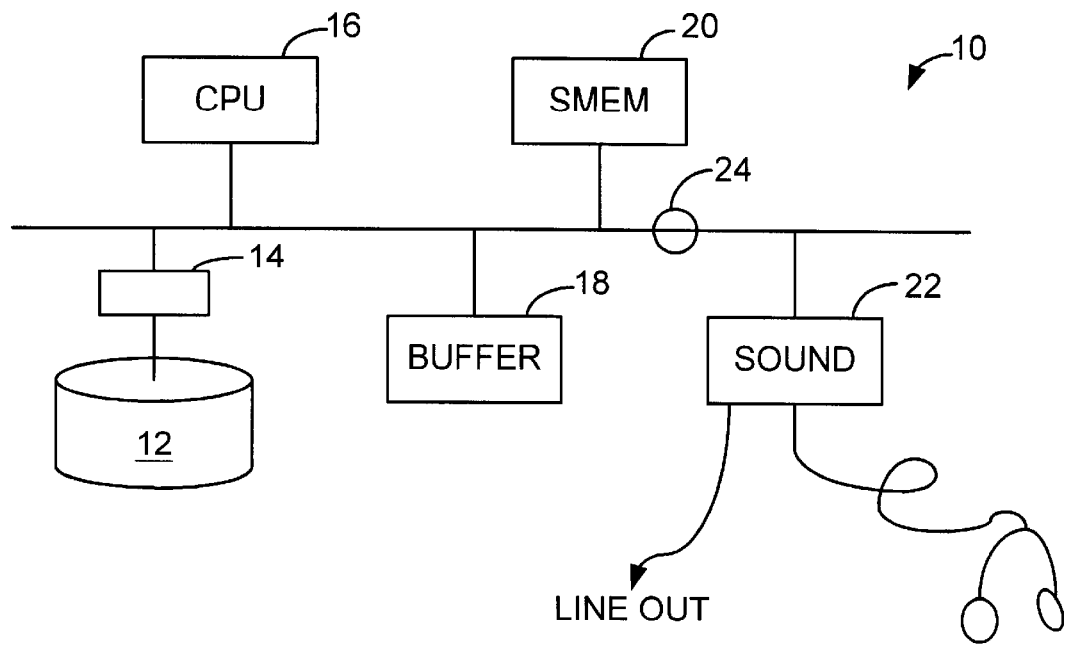
FIG. 1 is a block diagram of a system for implementing an embodiment of the invention.

FIG. 1 is a block diagram of a system 10 including a hard-disk drive (HDD) 12 and interface 14, central processing unit 16, a buffer 18, system memory 20, and audio subsystem 22 connected to bus 24. As is well-known in the art, the buffer 18 may be a part of the system memory 20 and various components may be integrated on a single chip or be part of chip set.

In a preferred embodiment the act described are implemented under control of the CPU which executes program code stored in the system memory. The program code can be stored in any computer readable medium including magnetic storage, CD ROM, optical media, or digital data encoded on an electromagnetic signal.

The CPU executes software to implement a power management system. As described above, the HDD may be in the IDLE, STANDBY, or SLEEP states. In the IDLE state the disk is spinning and data may be read from the disk. In the presently described embodiment, the data is compressed digital music, for example, music encoded in the MP3 format.

In the STANDBY and SLEEP states the disk is not spinning and the states differ by the amount of power consumed, the time required to transition back to IDLE, and the amount of power required to transition back to IDLE. SLEEP mode consumes less power but has a longer recovery time.

Figure 2:
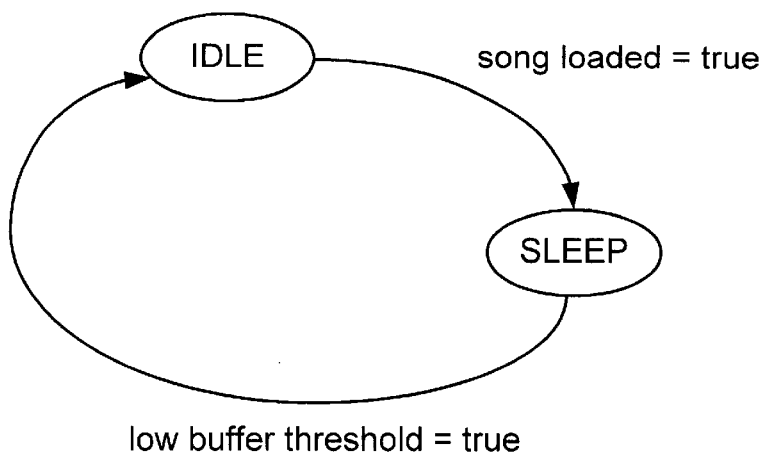
FIG. 2 is a state diagram depicting the transitions between modes of the HDD.

Typical power consumption numbers for an HDD used in the Nomad® Jukebox are:

spin-up (from standby or sleep)—900 mA max active mode—460 mA idle mode—170 mA standby mode—56 mA sleep mode—20 mA In the presently described embodiment, in response to a user request to play a track or a list of tracks, a block track data is transferred to the buffer until the buffer is full. In the presently described embodiment the buffer is implemented in system memory and may vary in size depending on how much of system memory is used for other purposes. As depicted in FIG. 2, when the block is loaded into the buffer, the HDD transitions from the IDLE mode to the SLEEP mode. The track data is then played from the buffer, that is, the track data is transferred from the buffer to the audio subsystem where the digital music data is transformed into an audio output signal utilizing techniques known in the art.

When the buffer data remaining to be played reaches a low threshold level, the HDD transitions from the SLEEP mode to the IDLE mode. An exemplary buffer management system for triggering this transition is depicted in FIG. 3.

Figure 3A:
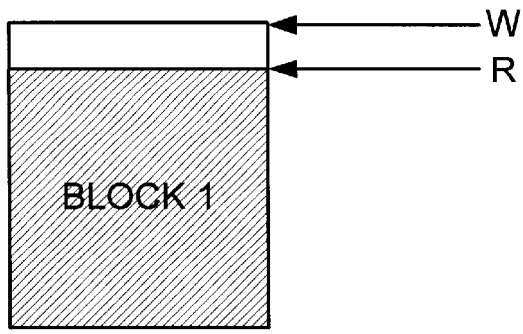
FIGS. 3A–3D are schematic diagrams depicting a buffer at various points in time.

Referring to FIG. 2 and FIGS. 3A–D, a first block is read from the HDD and stored in the buffer as depicted in FIG. 3A. Data is read from the storage location as depicted by the READ pointer and a subsequent writing of data will commence at the location indicated by the WRITE pointer. Subsequent to reading data from the disk the HDD transitions to the SLEEP mode.

Figure 3B:
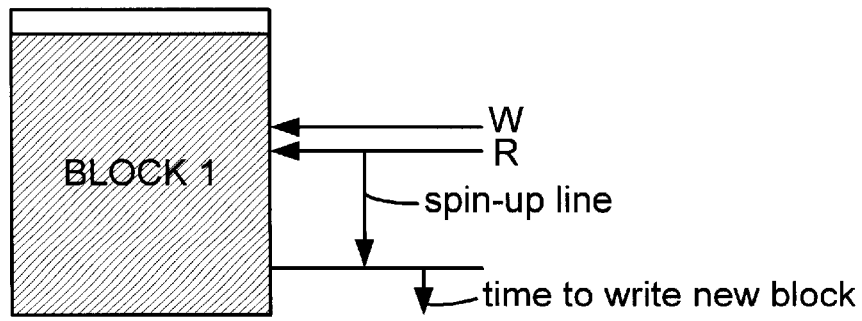

As depicted in FIG. 3B and FIG. 2, when the READ pointer reaches a threshold value, the software causes the HDD to transition to the IDLE mode from the SLEEP mode. This threshold can be set as a number of addresses from the beginning of the block because the amount of data read from the buffer translates as a known duration of audio. The threshold is set to take into account amount of time required to spin-up the disk to the IDLE mode and to read the next track into the buffer.

Figure 3C:
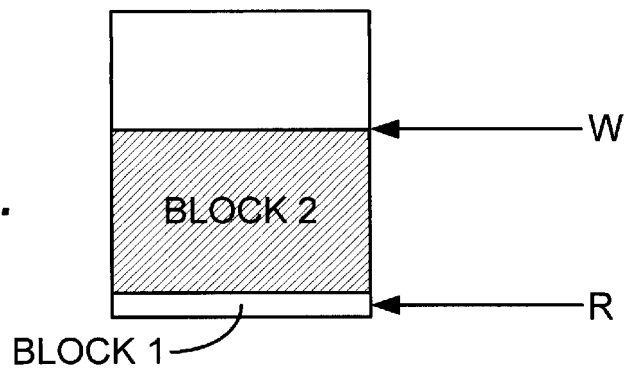
Figure 3D:
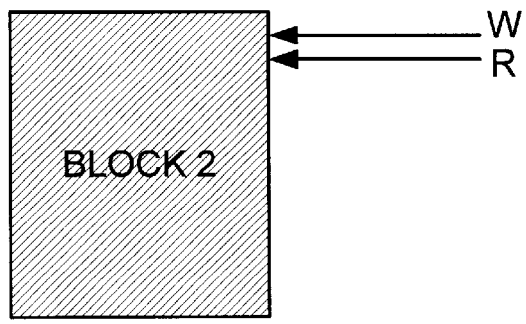

As depicted in FIG. 3C, when the read pointer is reaching the end of the first block, the second block is being stored in the buffer and the HDD transitions to the SLEEP mode again.

If the portable music player is being powered by an external supply then STANDBY mode may be utilized instead of SLEEP mode since a faster transition to IDLE may be more important than the lowest power drain. Alternatively, STANDBY mode can also be utilized when using battery power albeit with a large current drain on the batteries.

As set forth above, a large current drain on the batteries occurs during spin-up. If the battery is low, this power drain could cause the voltage output from the battery to drop to a low value that could cause the system to crash.

Accordingly, in one embodiment of the invention, if the voltage reading from the batteries indicates that battery life is very low, then HDD is not put into SLEEP mode between disk reads to avoid the large current drain required to spin the disk back up to IDLE.

The invention has now been described with reference to the preferred embodiments. Alternatives and substitutions will now be apparent to persons of skill in the art. For example, alternative buffer management techniques can be utilized to trigger the transitions to the power-saving mode. Further, in the embodiment described, a single track is read from the buffer between spin-downs. However, depending on the size of the buffer and characteristics of the HDD different size blocks of audio data may be stored in the buffer between spin downs. Accordingly, it is not intended to limit the invention except as provided by the appended claims.

What is claimed is:

1. A method, implemented by a processor in a digital music player that stores audio tracks on a hard disk drive, for managing the modes of the hard disk drive, said method comprising the acts of:

while the disk is spinning, reading a block of audio data from the disk and storing the block in a buffer;

subsequent to reading the block, spinning down the disk to a resting state and playing the block from the buffer;

while the block is being played from the buffer, monitoring the amount of the block left to be played;

when the amount the block left to be played drops to or below a low threshold level, transitioning the disk from the resting state back to a spinning mode so that data can be read from the disk before the block is finished being played from the buffer;

monitoring a battery voltage level in the digital music player; and if the battery voltage level is below a selected level, keeping the disk in the spinning state subsequent to reading the block from the disk to avoid a large current drain required to spin the disk up from the resting state.

2. The method of claim 1 wherein said step of reading and storing further comprises:

reading a track from the disk and storing the track in the buffer.

3. A computer program product comprising:

a computer readable medium having program code embodied therein for managing the modes of a hard disk drive, included in a digital music player for storing audio tracks, said program code comprising:

program code, executable by a processor for, while the disk is spinning, reading a block of audio data from the disk and storing the block in a buffer;

program code, executable by a processor for, subsequent to reading the block, spinning down the disk to a resting state and playing the block from the buffer;

program code, executable by a processor for, while the block is being played from the buffer, monitoring the amount of the block left to be played; and program code, executable by a processor for, when the amount of the block left to be played drops to or below a low threshold level, transitioning the disk from the resting state back to a spinning mode so that data can be read from the disk before the block is finished being played from the buffer;

program code, executable by a processor for, monitoring a battery voltage level in the digital music player; and program code, executable by a processor for, if the battery voltage level is below a selected level, keeping the disk in the spinning state subsequent to reading the block from the disk to avoid a large current drain required to spin the disk up from the resting state.

* * * * *